*INVENTOR.*
CLARENCE A. ANDERSON
BY
Whittemore Hulbert & Belknap
ATTORNEYS

Nov. 18, 1952     C. A. ANDERSON     2,618,734
INDUCTION HEATING UNIT

Filed Dec. 12, 1949     2 SHEETS—SHEET 2

*INVENTOR.*
CLARENCE A. ANDERSON
BY
*Whittemore Hulbert & Belknap*
ATTORNEYS

Patented Nov. 18, 1952

2,618,734

UNITED STATES PATENT OFFICE 2,618,734

INDUCTION HEATING UNIT

Clarence A. Anderson, Dearborn, Mich.

Application December 12, 1949, Serial No. 132,440

6 Claims. (Cl. 219—47)

The invention relates to a means for induction heating of sheet metal and, more particularly, for the heating of flat sheet metal blanks as a preliminary step in the fashioning of the same for the manufacture of vehicle wheels and for similar purposes.

It is the primary object of the invention to obtain an essentially uniform generation and distribution of the heat throughout a desired zone around the periphery of the blank, but not to include a small portion near the center of the blank, by means of low-frequency induction heating. By low-frequency, in this instance, is meant frequencies below 1000 cycles per second, with special reference to the frequencies used in commercial electric power distribution such as 25, 50, and 60 cycles per second. A uniform generation and distribution of heat throughout a desired area of a blank is readily obtainable by the use of higher frequencies; i. e., frequencies high enough so that skin effect keeps the induced current flowing in a surface layer that is only about one-third or less of the thickness of the sheet metal blank. When a sufficiently high frequency and a sufficiently high rate of power input is used in induction heating, it is necessary only to position the inductor coil in close proximity to the piece to be heated in order to produce in the piece a heat pattern which closely coincides with the shape of the inductor coil. For heating a sheet of mild steel ¼ inch thick to a temperature of 1650° F. it is necessary in the normal practices of induction heating to use a frequency above 50,000 cycles per second in order to obtain best efficiency of energy utilization and best control of heat pattern. With the use of my invention, 18 inch diameter octagonal blanks of $\frac{1}{8}$ inch thick steel have been heated to 2000° F. by induction heating at a frequency of 60 cycles per second with essentially uniform heat distribution around the periphery and a 9 inch diameter unheated zone at the center. The unheated center zone in this case could have been decreased to 5 inches in diameter if necessary. The efficiency of heat input to the metal blank is considerably better than that obtained by high-frequency induction heating, largely because of the elimination of the frequency conversion apparatus and its attendant energy losses through the direct use of the 60 cycle power.

It is a purpose of my invention not only to heat a metal blank around its periphery uniformly from its outer edge radially inward to a desired distance, but it is also the purpose of my invention to heat a blank of polygonal or other shape having angularly spaced salients along the periphery so that the salients have essentially the same temperature as the remainder of the heated zone. For the purposes of induction heating of salients or corners in a metal blank an equilateral polygon of 16 or more sides could be considered as the equivalent of a circle.

With these objects in view the invention consists in the construction as hereinafter set forth.

In the manufacture from sheet metal blanks of vehicle wheels and similar structures where the load is carried radially from center to circumference, it is highly desirable to have a greater thickness of metal at the center than at the periphery. However, the stock from which the blanks are cut is originally of uniform gauge which necessitates rolling or otherwise fashioning the same to an outwardly tapering radial cross section. The uniform electrical heating of the blanks preliminary to such rolling is rendered difficult by reason of the small dimension in thickness relative to that of diameter. Also there is economy in cutting from the stock polygonal rather than circular blanks and in drawing the polygonal blank into a generally circular form during the rolling process. This increases the difficulty of uniform heating as the salients or angles or corners are more or less out of the path of the heating currents so as not to attain the full temperature.

With my improvement these difficulties are largely overcome by the construction and arrangement of the magnetic flux conducting members and their energizing coils through which the heating currents within the blank are generated.

Figure 1:
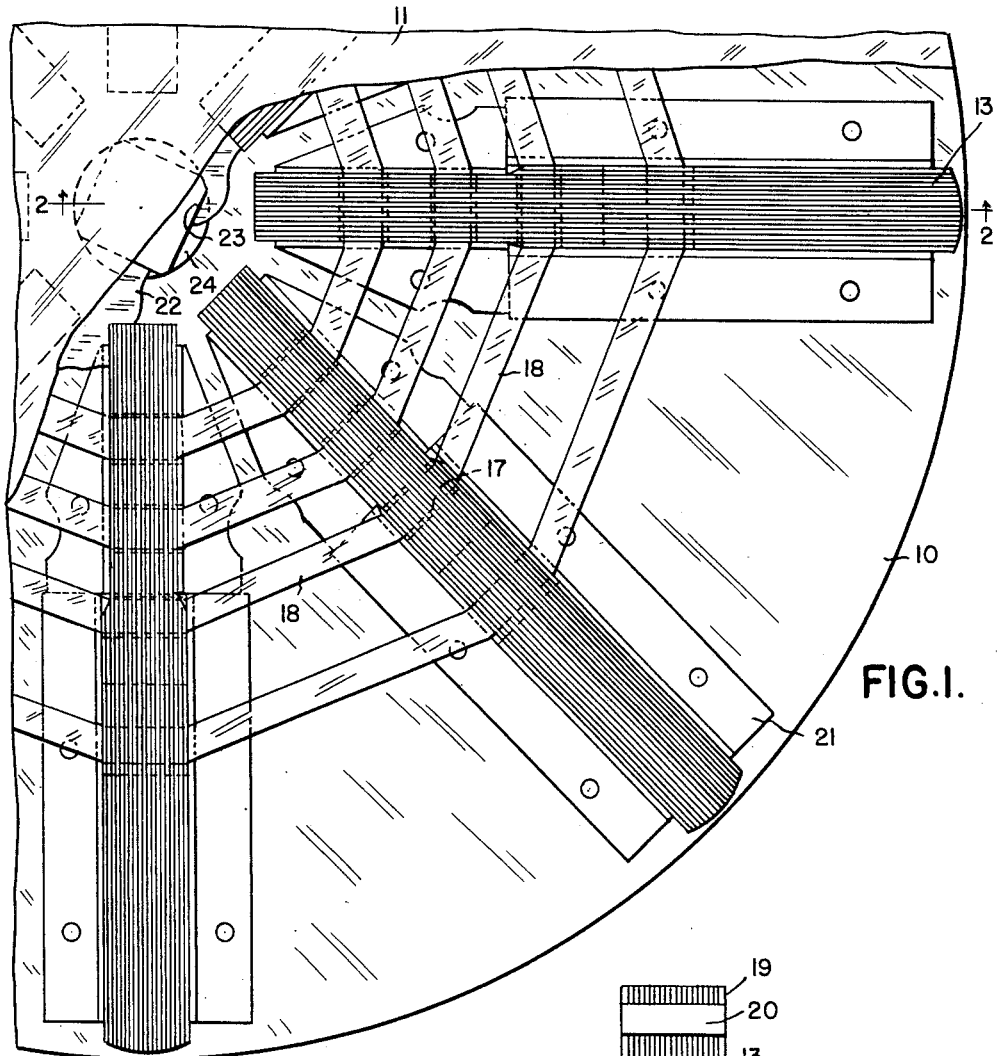
Figure 1 is a plan view of my improved electrical heating means.
Figure 3:
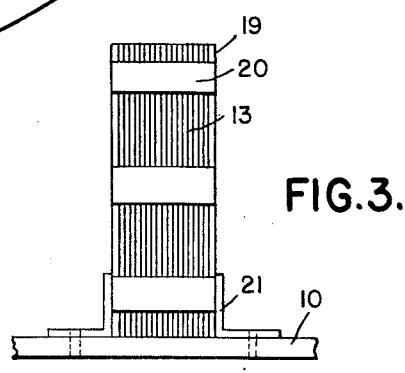
Figure 3 is an end elevation of a portion of Figure 2.
Figure 2:
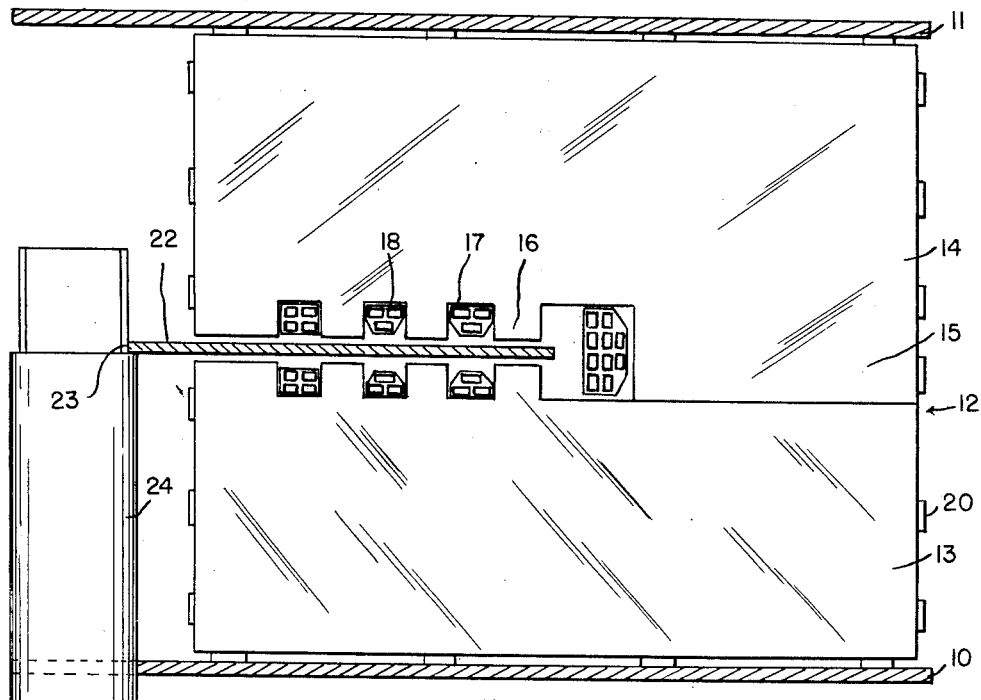
Figure 2 is a cross section on line 2—2 of Figure 1 illustrating the construction of one of the flux conducting members.

The general construction of the apparatus comprising the supporting frame and the mechanism for moving the supporting plates of the electrical heating means forms no part of the instant invention, and I shall therefore confine the description to that of the electrical heating means. As illustrated 10 and 11 are circular supporting plates for the mounting thereon of the magnetic and electrical elements. The specific construction is designed for the heating of octagonal blanks and therefore the number of magnetic flux conducting elements used is eight, corresponding to the number of salients in the periphery of the bank. However, for other polygonal blanks the number of these elements may be varied. 12 designates one of the flux conducting elements which is formed in separable lower and upper sections 13 and 14 together forming a U-shaped structure and respectively mounted on the plates 10 and 11 to extend radially inwardly thereof. The section 14 has in its outer portion a downward extension 15 which contacts with a corresponding area in the outer portion of the section 13. The inner portions of these sections have their adjacent faces spaced sufficiently to receive the blank therebetween, and these portions are formed with the alternating transversely extending tooth portions or teeth 16 and slots 17 with the tooth portions and slots in vertical registration and registering tooth portions innermost of the series of tooth portions and slots, and registering slots outermost of the series. The slots receive the energizing electric coils 18 which are in concentric relation to each other and engage in the slots of all of the elements 12. In the present instance, all of the coils 18 are connected electrically in series and across a nominal 440 volts 60 cycles supply circuit. The outermost and innermost coils have a greater number of turns than the intermediate coils so that the outer and inner edges of the desired heated zone of the blank are heated to a temperature essentially the same as the remainder of the heated zone. In this specific case the outermost coil contains 10 turns. The next coils contain 3 turns each in the upper and lower portions above and below the blank making a total of 6 turns covering this portion of the blank. The next coils inward again have a total of 6 turns above and below the blank. The innermost coils have a total of 8 turns above and below the blank. The magnetic flux carrying elements are laminated as is usual in transformer construction. The laminations of each of the sections may be held together by the usual methods employed in transformer construction such as by means of clamps or insulated rivets but for the sake of greater rigidity the laminae are secured in relation to each other by outer side plates 19 and external connecting cross strips 20. These are arranged at the radially outer and inner ends and also at the top and bottom and are preferably welded to both the plates and the laminae. As illustrated in Figures 1 and 2, the elements 12 are arranged to register with the several salients in the periphery of the blank and extend radially inward into fairly close proximity at their inner ends and not far from the center of the blank. The elements 12 are secured to their mounting plates by the angle members 21, which hold them in rigid relation to each other and in registration with the salients of the blank. This blank 22 has a polygonal aperture 23 at its center to engage a corresponding post 24 mounted on the lower plate 10.

In operation the plates 10 and 11 are movable with respect to each other to separate the sections 13 and 14 of the flux conducting members and to permit of inserting the blank 22 and engaging the same with the post 24. The polygonal engagement of the post and blank holds the latter with the salients thereof in registration with the elements 12. The blank may be supported by any suitable means, but if the blank is heated rapidly it may rest directly on the tooth portions 16. There will not be time for sufficient heat to be conducted from the blank to the tooth portions to seriously disturb the heat pattern especially if each tooth portion is slightly uneven so that the blank makes essentially only a point contact with it. However, as above stated, the structure of the supporting frame and mechanism for moving the plates forms no part of the instant invention. After the insertion of the blank, the plates 10 and 11 are relatively moved to bring the sections 13 and 14 together, the portion 15 of the section 14 contacting with the section 13. When current is passed through the coils 18, magnetic flux will be generated in the sections 13 and 14 and will pass through each pair of the registering tooth portions 16 and the blank between the same and the portion 15 of the section 14 and the portion of the section 13 in contact with the portion 15. This will generate heating currents within the blank and, due to the fact that the passage of flux through the outer tooth portions is greater than through those radially inward therefrom, correspondingly greater voltages will be induced in the outer portions of the blank, in order that the same intensity of heating currents shall flow in the long path around the outer portion of the blank as may flow in shorter paths which are closer to the center of the blank. If the tooth and slotted portions of the flux carrying members and the number of turns in the various coils are properly proportioned the entire desired heated area will be heated with substantial uniformity.

Figure 4:
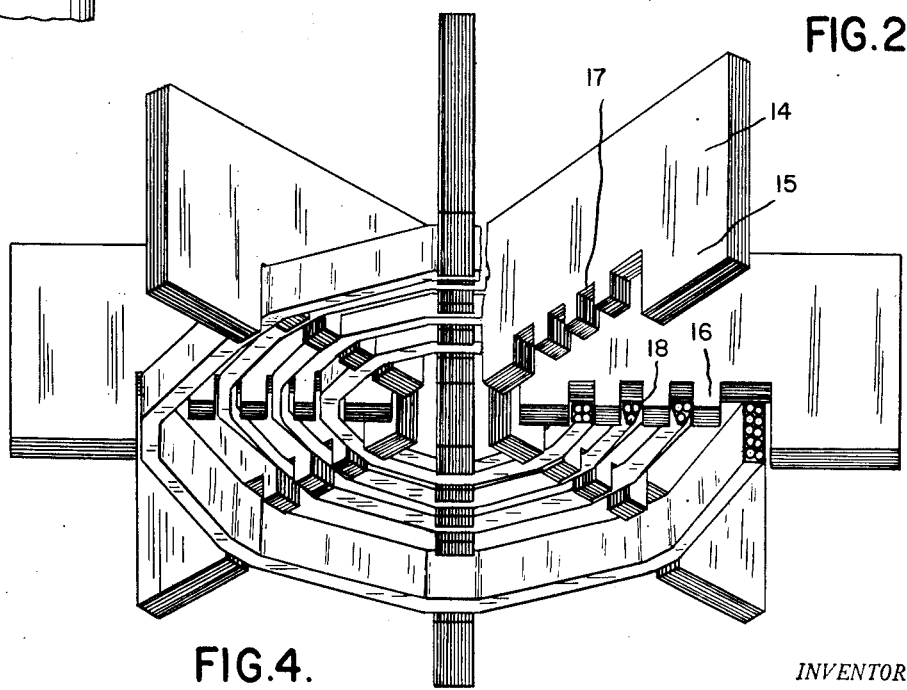
Figure 4 is a perspective view partly broken away of the upper portion of the electrical heating means to illustrate the theory of operation.

The actual proportions used in a specific case using electric current of 440 volts 60 cycles per second frequency for heating octagonal blanks having a 19 inch diameter across the flats were as follows. The innermost edges of the flux carrying members 12 were located 2¾ inches radially outwardly from the center of the blank to be heated. The flux carrying elements 12 were made 1½ inches thick. The innermost tooth portion was two inches long. Subsequent slots and tooth portions were one inch long each except the outermost slot which was 2⅛ inches long. That portion of the elements 12 beyond the outermost slot formed the return path for all of the flux passing through the blank between all of the tooth portions 17 and therefore is as large or larger than the sum of all the tooth portions. As is usual in induction heating the coils were made of copper tubing so that cooling water or other cooling medium may be circulated through the coils. Round copper tubing is shown in Figure 4 but rectangular copper tubing is preferred for compactness.

What I claim as my invention is:

1. Heating means for sheet metal blanks comprising a plurality of generally U-shaped magnetic flux conducting members arranged in spaced angular relation to each other with each member embracing the blank and extending radially inward thereof, each of said members having parallel spaced portions on opposite sides of the blank provided alternately with teeth and coil receiving slots, the outer slots extending beyond the periphery of the blank and the connecting portion of the U being beyond said outer slots, and concentric energizing electric coils located in the respective slots of all of said members.

2. Heating means for sheet metal blanks having one or more salients projecting outward beyond other portions of the periphery, comprising a generally U-shaped magnetic flux conducting member embracing said blank and extending radially inwardly thereof in registration with said salient, the parallel portions on opposite sides of the blank having alternating teeth and coil receiving slots, the outermost slot being larger than the others and located beyond the periphery of the salient, and concentric energizing electric coils in said slots with the coils engaging the outermost and innermost slots having a greater number of turns than the remaining coils.

3. Heating means for sheet metal blanks having salients projecting outwardly beyond other portions of the periphery comprising generally U-shaped magnetic flux conducting members embracing said blank and extending radially inwardly thereof in registration with the salients, said members having portions on opposite sides of the blank provided with series of alternating teeth and coil receiving slots and concentric energizing electric coils in said slots with the outermost coil having a greater number of turns than the remaining coils.

4. Heating means for polygonal sheet metal blanks comprising a plurality of generally U-shaped magnetic flux conducting members embracing the blank and extending radially inwardly thereof in registration with the respective salients of the polygon, the parallel portions of each of said members on opposite sides of the blank having alternating teeth and coil receiving slots, the outermost slots being larger than the others and extending beyond the salient, and concentric energizing electric coils located respectively in the corresponding grooves of all of said members.

5. Heating means for octagonal blanks comprising eight generally U-shaped magnetic flux conducting members embracing the blank and extending radially inwardly thereof in registration with the respective salients of the octagonal blank, each of said U-shaped members comprising separable sections having portions for extending respectively above and below the blank with alternating teeth and coil receiving slots therein, the outermost slot extending beyond the salients of the octagonal blank, and the portions of the sections beyond said slots contacting each other, and concentric energizing electric coils engaging the corresponding slots of all of said members, the outermost coil having a greater number of turns than the remaining coils.

6. Heating means for flat sheet metal blanks having one or more salients projecting outward beyond other portions of the periphery, comprising a generally U-shaped magnetic flux conducting member embracing the blank and extending radially inwardly thereof in registration with the salient and having flat parallel portions on opposite sides of the blank provided with alternating teeth and coil receiving slots, the outermost slot being located beyond the periphery of the salient and concentric energizing electric coils in the slots.

CLARENCE A. ANDERSON.

REFERENCES CITED

The following references are of record in the file of this patent:

UNITED STATES PATENTS

| Number | Name | Date |
| --- | --- | --- |
| 1,609,132 | Sederholm | Nov. 30, 1926 |
| 1,981,629 | Northrup | Nov. 20, 1934 |
| 2,352,332 | Limpel | June 27, 1944 |
| 2,448,011 | Baker | Aug. 31, 1948 |
| 2,448,062 | Stoltz | Aug. 31, 1948 |